United States Patent

[11] 3,610,862

| [72] | Inventor | Paul M. Erlandson<br>Palos Park, Ill. |
|---|---|---|
| [21] | Appl. No. | 795,515 |
| [22] | Filed | Jan. 31, 1969 |
| [45] | Patented | Oct. 5, 1971 |
| [73] | Assignee | Continental Can Company<br>New York, N.Y. |

[54] METHOD AND APPARATUS FOR RESISTANCE WELDING UTILIZING APPLICATION OF HIGH PRESSURE
2 Claims, 7 Drawing Figs.

[52] U.S. Cl. .................................................. 219/67,
219/59, 219/64, 219/82, 219/117
[51] Int. Cl. ........................................................ B23k 31/06
[50] Field of Search ............................................ 219/67, 81,
82, 83, 64, 78, 86, 91, 117

[56] References Cited
UNITED STATES PATENTS

| 3,288,979 | 11/1966 | Mills et al. .................... | 219/104 |
| 1,252,146 | 1/1918 | Murray ......................... | 219/83 |
| 2,629,806 | 2/1953 | Anderson ..................... | 219/83 |
| 2,864,933 | 12/1958 | Smith ............................ | 219/64 |
| 2,957,975 | 10/1960 | Pearson ........................ | 219/81 |
| 3,092,715 | 6/1963 | Hallas ........................... | 219/83 X |

OTHER REFERENCES
Iron Age, April 15, 1926, p. 1048
The Welding Journal, May 1942, p. 317

Primary Examiner—J. V. Truhe
Assistant Examiner—L. A. Schutzman
Attorney—Petherbridge, O'Neill & Aubel ABSTRACT: A method and apparatus are disclosed herein for electrical resistance welding wherein a high pressure is applied by the welding electrodes to the overlapped portions of metallic blanks concurrently as a high current is supplied to the electrodes.

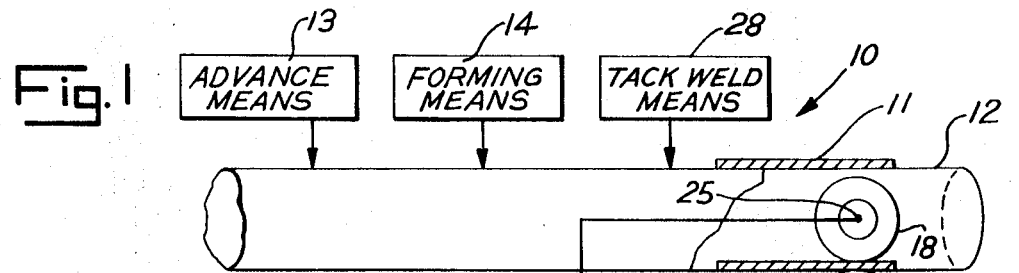
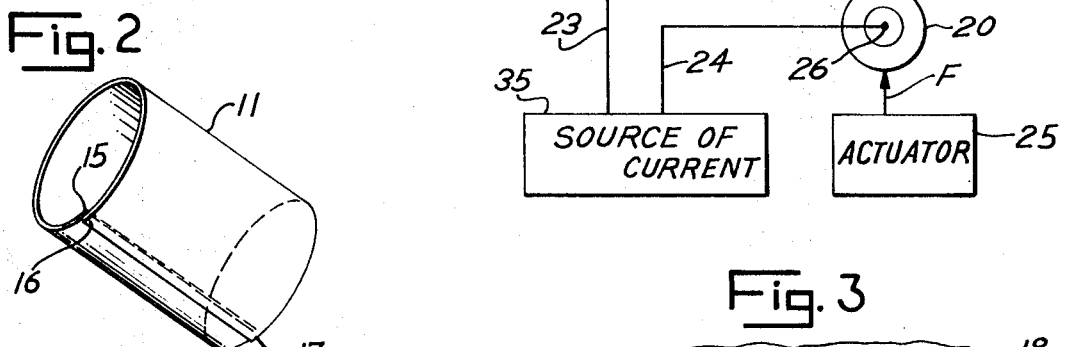
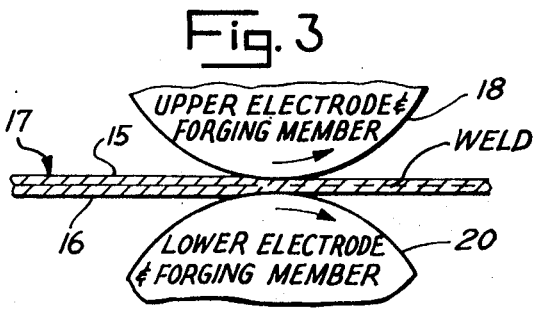
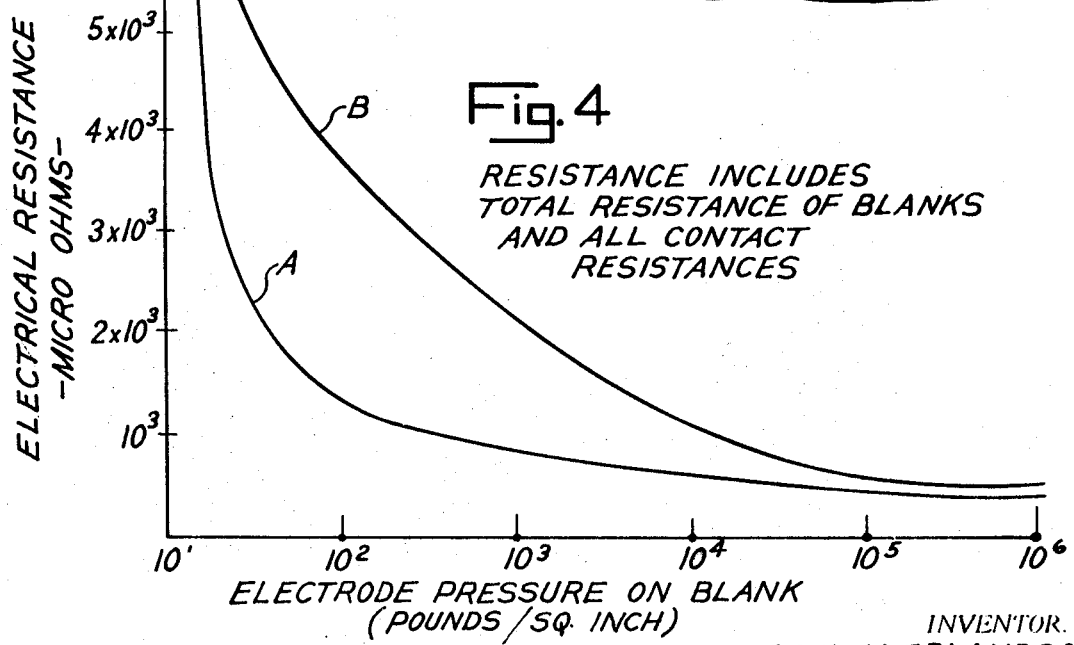
INVENTOR.
PAUL M. ERLANDSON

INVENTOR.
PAUL M. ERLANDSON
BY
Petherbridge, O'Neill & Aubel
ATTORNEYS

METHOD AND APPARATUS FOR RESISTANCE WELDING UTILIZING APPLICATION OF HIGH PRESSURE

This invention relates generally to a method and apparatus for electrical resistance welding, and more particularly to a method and apparatus for providing a seam weld along portions of overlapped metallic blanks.

In the field of welding can bodies, the metallic blanks for forming the can bodies are commonly formed into a tubular shape having overlapping edge portions which are passed through welding electrodes to weld the edge portions along a seam. Heretofore, the electrical resistance of the overlapping edge portions has been subject to wide variations and thus the heat or weld energy generated by the weld current is also subject to wide variations which tend to produce unsatisfactory welds where gastight seams are required.

Accordingly, it is a primary object of this invention to provide a method of resistance welding wherein a high pressure and a high current are concurrently provided to obtain a minimum variations in the resistance of the overlapped portion and hence effect an improved weld.

Another object of this invention is to provide apparatus capable of effecting the method in accordance with the foregoing primary object of this invention.

It is another object of this invention to provide a method of seam welding can bodies including the forming of blanks into a tubular shape having overlapped portions, inserting such portions between two aligned electrodes which effect a high pressure on said portions and also provide a high welding current to the blanks.

The nature of the invention will be more clearly understood by reference to the following detailed description, the appended claims, and the several views illustrated in the accompanying drawings.

In the drawings:

FIG. 1 is a diagrammatic view of a can body seam welding apparatus according to the invention;

FIG. 2 is an isometric view of a tubular cylinder showing the overlapping portions;

FIG. 3 is an enlarged view, partly in cross section, showing a blank being welded by the welding electrodes;

FIG. 4 is a graph showing the variation in electrical resistance as a function of pressure;

Figure 5:
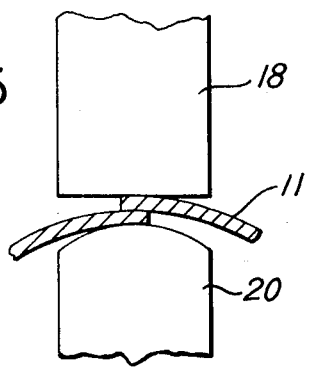
FIG. 5 is an end view of the electrodes shaped to enhance lateral flow of the metal.

Referring to the drawings, FIG. 1-3 indicate in block diagram form an apparatus 10 which may be of any suitable known type for forming metallic blanks 11 into tubular can bodies. The apparatus 10 includes an elongated metallic horn 12 and advance means 13 for conveying the blanks 11 along the horn 12. As the blanks 11 are moved along the horn 12, forming means 14 gradually bend the blanks 11 from a flat rectangular shape into a closed cylindrical shape encircling the horn 12 to thereby form the blanks 11 such that the side edges 15 and 16 (see FIGS. 2 and 3) meet and overlap to provide a lapped portion 17 of from three to ten times the thickness of the sheet metal.

As is conventional, the overlapped portions of the blanks 11 are then tack welded by tack-weld means 28 at intervals along the length of the lap to hold the edges of the blanks in registration before the blanks are passed through the welding electrodes. The cylindrical tacked body blank 11 is then passed between two juxtapositioned roller electrodes 18 and 20 which act both as welding electrodes and as forging members.

Roller electrode 18 is rotatably mounted and positioned such that the peripheral surface of the electrode 18 contacts the upper surface (as oriented in FIGS. 1 and 2) of the blank edge portion 15 during passage of the formed blank between the electrodes.

The second roller electrode 20 is positioned to be in alignment with the first electrode 18 and has its peripheral surface positioned for engagement with a lower surface of the blank edge portion 16 during passage of blank 11 between the two electrodes 18 and 20.

The electrode 20 is rotatably mounted and supported for upward movement by a suitable mounting device such as fast-acting force actuator 25 which provides a force to the electrode 20 and the blanks passing between the electrodes.

It will, or course, be understood that while in the embodiment shown the electrodes disclosed are of the roller type, the invention is not limited thereto but is also applicable to apparatus in which other types of electrodes such as sliding electrodes are utilized.

A suitable current source 35 provides a current of relatively constant amplitude and is electrically connected to the electrodes 18 and 20 by the conductors or leads 23 and 24 which contact the electrodes 18 and 20 through suitable rotary mounting connections 25 and 26. As is known, the metallic horn 12 may, itself, constitute a portion of one of the leads 23 or 24 such that conduction of the current occurs through the horn itself or low-resistance conductors container therein.

In accordance with the invention, a high electrode pressure is applied to the blank 11 being welded as a high current is concurrently supplied to the electrodes 18 and 20. Note that the roller electrodes 18 and 20 apply a high pressure and a high current to a relatively small area of the lapped metal during a given instant. Accordingly, pressures of the order of 80,000 to 100,000 pounds per square inch, and current densities in the order of $5 \times 10^6$ amperes per square inch are desirably provided to obtain consistently high quality welds.

As an example, the yield strength of the sheet metal of the blanks 11 used in one application is in the range of about 70,000–90,000 pounds per square inch. The electrode force applied is about 140 pounds, and the actual area of contact between the electrodes and the metal blanks, the so-called "electrode footprint," is about 0.040 inches wide and 0.040 inches long for an effective area of $16 \times 10^{+4}$ square inches.

At 140-pound force, the equivalent average pressure is about 87,500 pounds per square inch. Since the sheet metal is not perfectly smooth, the electrodes initially apply this 140-pound force to a considerably smaller area consisting of the high points on the sheet metal and, hence, the initial applied pressure is thus very high.

As mentioned above, the relatively high and essentially constant current is supplied to the electrodes concurrently as the pressure is applied by the electrodes to the metal blanks 11. The electrical resistance of the small area to which the pressure is initially applied is relatively high, and hence the constant current supplied causes this small area to be heated rapidly. Rapid heating, and hence rapid welding, is required since it is desired to operate the welding apparatus at speeds wherein at least 250 can body blanks, each 5 inches in length, are welded per minute.

The blanks 11 moving in a horizontal plane (as oriented in FIG. 1) provide a force F which has an effective vertical component equal to approximately 0.1 F. Thus, if the roller electrodes are in a forced-together or abutting position, a large horizontal force is required to insert a blank 11 between the electrodes. Accordingly, it is desirable to program the force F to vary as a function of time or position of each blank 11 during the welding cycle. In the embodiment of FIG. 1, a high-speed actuator such as, for example, a "Polynoid" actuator is utilized to vary the force exerted on the electrodes.

It has been found that the rate of change of electrical resistance decreases as pressure is increased in accordance with the curves A and B of FIG. 4 which curves are representative of the results obtained from numerous tests. The resistance indicated in along the axis of the abscissa in FIG. 4 includes the combined electrical load resistances of the blank (workpiece) and all the contact resistance present between lead 23, electrode 18, blank 11, electrode 20 and lead 24.

Thus, as shown in FIG. 4, the electrical resistance of the blanks 11 changes as a function of pressure from a high value at pressures of a few pounds per square inch down to a relatively low and constant value at pressure of approximately $10^5$ pounds per square inch and above.

Accordingly, when the welding is done under high pressure, changes in electrode pressures cause relatively minor variations in the resistance of the electrical load; that is, the resistance presented to the flow of the welding current by all the contact resistances in the electrical circuit as well as the resistances of the electrodes and of the blanks is relatively more constant. Further, at the higher pressure at which the apparatus of the invention is operated there is considerably less difference between the resistance of the tack weld, and the resistance of the lap seam between the tack welds thus providing more uniform and consistent welds throughout the length of the weld seam. The increased pressure also reduces the arcing and heating at the electrodes which may be due to poor electrical contact and thus reduces the wear on the electrodes as well as tending to produce better, more uniform welds.

Note that the foregoing is in contrast to the prior art which teaches that relatively light pressure should be exerted on the lapped members during heating to increase the electrical resistance offered by the electrical load; that is, the workpiece. Following this heating phase, some prior art applies a momentary followup pressure to forge the materials together. However, in such prior art processes wherein a light pressure is applied during heating, the heating process is difficult to control due to the fact that at low pressures a very small variation in pressure will cause a very large variation in load resistance.

The amount of pressure that should be applied to the blanks to be welded depends on a number of factors. For instance, while the electrical resistance of the metal increases with an increase in the temperature, the area to which pressure is applied increases as the workpiece surfaces, as well as the electrode surfaces, are subjected to deformation and, accordingly, the overall electrical resistance between the electrodes and the workpieces as well as the resistance between the two workpiece surfaces decreases. Thus, the current density (current per unit area) decreases, causing the heating rate to also decrease. As the same force is applied to a larger area, the pressure reduces hence the electrical resistance of the workpiece tends to increase. Thus, since there are various unknown variables, it has been found that electrode force, and the range of pressures, which should be applied to the blanks to be welded is most conveniently determined by empirical rather than theoretical means.

Note also that too high of a pressure results in excessive wrinkling of the blanks at the laps, and bellying of the can. Further, too high pressures result in excessive wear on the electrodes. Also, as can be observed from the curves of FIG. 4, a point of diminishing returns is reached wherein the resistance remains essentially constant regardless of the pressure applied.

The high pressures and the heating of the metal cause a lateral flow of material such that the thickness of the overlapped areas is reduced by about 40 percent. That is, if the original thickness of the lap is $2t$ the final thickness of the lapped seam is reduced to about $1.2t$. In such mode of operation and within these limits there is little longitudinal flow of the metal, as indicated by the fact that the tack welds are not ruptured; nor, is there appreciable buckling or waviness produced along the length of the seam.

We have found that with a very narrow lap and very high forging pressure the normal lapped structure may tend to change to a diagonal interface typical of a mashed lap structure. HOwever, with a constant current power supply even the sharply reduced lap will not overheat, and the temperature of the metal at the welding point may actually decrease. This may be due to the fact that when very narrow laps are employed there is a shearing action between the two pieces which exposes additional metal to lower the interface resistance and thereby sharply limit the heating effect of the higher current density. The narrow laps also reduce the amount of material added to the circumferential dimension of the blank and thus reduces the so-called banana effect and/or ripples or waves.

While lateral flow of the material is obtained by using roller electrodes having flat peripheral surfaces, lateral flow of the metal material may be enhanced by shaping one of the forging-roller electrodes to have a flat contour across the outside of the seam, and the other forging-roller electrode to have a slight radius as shown in an exaggerated showing in FIG. 5. The rapid heating of the metal in the nip of the rollers and the subsequent rapid cooling after passage of the metal from between the rollers tends to inhibit longitudinal flow. Note also that the electrodes are of much greater width than the lapped blank edges, hence the electrodes contact the entire width of the lap regardless of variations in the position of the lap with respect to the electrodes.

Figure 6:
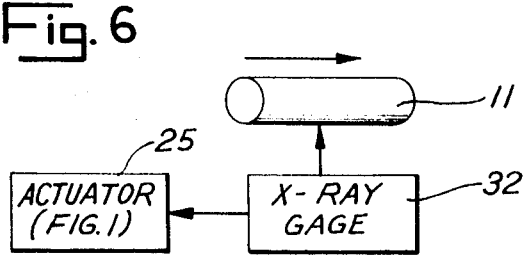
FIG. 6 is a diagrammatic showing of a portion system of a feedback for controlling the applied pressure.
Figure 7:
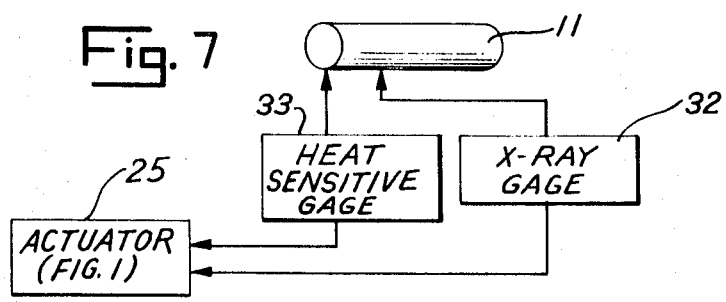
FIG. 7 is a diagrammatic showing of a second feedback system sensitive to both temperature, and to lap thickness.

A feedback control system, as shown in FIG. 6, is provided which senses the thickness of the lapped seam emerging from the welding electrodes. The sensing unit may comprise an X-ray thickness gage 32, or eddy current gage of any suitable type. For any given sheet metal the thickness of the lapped seam emerging from the electrodes is dependent on the pressure applied by the electrodes. The feedback control system of FIG. 6, thus provides a control to the force being applied to the blanks 11 by the electrodes 18 and 20, in accordance with a preselected desired applied pressure. A second feedback control system including a heat-sensitive gage 33 of any suitable type may concurrently be employed which is sensitive to temperature to provide a control which is dependent on both the heating a forging or pressure-applying functions, as shown in FIG. 7.

While this invention has been particularly shown and described with reference to preferred embodiments thereof, it will be understood by those skilled in the art that various changes in form and detail may be made therein without departing from the spirit and scope of the invention.

I claim:

1. A method for high-quality resistance welding of individual cylindrically formed metallic blanks having overlapped edge portions serially passing between and in contact with a pair of spaced welding electrodes comprising the steps of applying a force to said electrodes for transmitting a high pressure to said overlapped edge portions serially passing in contact therewith, and applying a current to said electrodes during application of said force of a magnitude sufficient to maintain a current density of approximately $1 \times 10^6$ to approximately $5 \times 10^6$ amperes per square inch.

2. The method according to claim 1 wherein the pressure applied is in the range of 80,000 to 100,000 pounds per square inch.

UNITED STATES PATENT OFFICE
CERTIFICATE OF CORRECTION

Patent No. 3,610,862         Dated October 5, 1971

Inventor(s) Paul M. Erlandson

It is certified that error appears in the above-identified patent and that said Letters Patent are hereby corrected as shown below:

Column 1, line 21, "variations" should read -- variation --. Column 2, line 23, "container" should read -- contained -- ; line 40, "16 X 10+4" should read -- 16 X 10-4 -- . Column 3, line 4, "pressure" should read -- pressures -- ; line 12, "pressure" should read -- pressures -- . Column 4, line 4, "HOever" should read -- However -- ; line 40, "a" should read -- and -- .

Signed and sealed this 31st day of October 1972.

(SEAL)
Attest:

EDWARD M. FLETCHER, JR.
Attesting Officer

ROBERT GOTTSCHALK
Commissioner of Patents